(12) United States Patent
Zhang et al.

(10) Patent No.: US 12,477,137 B2
(45) Date of Patent: *Nov. 18, 2025

(54) PROCESSING SUB-PARTITIONS USING REFERENCE PIXELS

(71) Applicant: HULU, LLC, Santa Monica, CA (US)

(72) Inventors: Wenhao Zhang, Beijing (CN); Jing Cui, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,631

(22) Filed: Jun. 18, 2024

(65) Prior Publication Data

US 2024/0340433 A1   Oct. 10, 2024

Related U.S. Application Data

(63) Continuation of application No. 17/542,008, filed on Dec. 3, 2021, now Pat. No. 12,041,251, which is a
(Continued)

(51) Int. Cl.
*H04N 19/105* (2014.01)
*H04N 19/119* (2014.01)
(Continued)

(52) U.S. Cl.
CPC ......... *H04N 19/436* (2014.11); *H04N 19/105* (2014.11); *H04N 19/119* (2014.11); *H04N 19/159* (2014.11); *H04N 19/40* (2014.11)

(58) Field of Classification Search
CPC .. H04N 19/436; H04N 19/105; H04N 19/119; H04N 19/159; H04N 19/40;
(Continued)

(56) References Cited

U.S. PATENT DOCUMENTS 10,887,587 B2   1/2021   Filippov et al.
2003/0021344 A1   1/2003   Panusopone et al.
(Continued)

FOREIGN PATENT DOCUMENTS

CN   103533375 A   1/2014
CN   103975596 A   8/2014
(Continued)

OTHER PUBLICATIONS

First Office Action for Chinese Application No. 2020800390449, dated Jul. 8, 2024, 22 pgs.
(Continued)

*Primary Examiner* — Hesham K Abouzahra
(74) *Attorney, Agent, or Firm* — Kwan & Olynick LLP

(57) ABSTRACT

A method includes transcoding, by a first transcoding process, a first sub-partition of a current block using a first set of reference pixels. Also, the method includes transcoding, by a second transcoding process, a second sub-partition of the current block using the first set of reference pixels. The first transcoding process transcodes a third sub-partition of the current block based on a second set of reference pixels. The second transcoding process transcodes a fourth sub-partition of the current block based on a third set of reference pixels.

20 Claims, 10 Drawing Sheets

Related U.S. Application Data continuation of application No. 16/886,627, filed on May 28, 2020, now Pat. No. 11,197,009.

(60) Provisional application No. 62/854,736, filed on May 30, 2019.

(51) Int. Cl.
  *H04N 19/159* (2014.01)
  *H04N 19/40* (2014.01)
  *H04N 19/436* (2014.01)

(58) Field of Classification Search
  CPC .. H04N 19/182; H04N 19/593; H04N 19/124; H04N 19/11; H04N 19/42; H04N 19/91; H04N 19/184
  See application file for complete search history.

(56) References Cited

U.S. PATENT DOCUMENTS

| | | |
|---|---|---|
| 2008/0120676 A1 | 5/2008 | Morad et al. |
| 2008/0187044 A1 | 8/2008 | Kim et al. |
| 2012/0163460 A1 | 6/2012 | Chien et al. |
| 2013/0101035 A1 | 4/2013 | Wang et al. |
| 2013/0121417 A1 | 5/2013 | Chong et al. |
| 2013/0182775 A1 | 7/2013 | Wang et al. |
| 2013/0182779 A1 | 7/2013 | Lim et al. |
| 2013/0188699 A1 | 7/2013 | Joshi et al. |
| 2013/0272370 A1 | 10/2013 | Coban et al. |
| 2014/0072041 A1 | 3/2014 | Seregin et al. |
| 2014/0334532 A1* | 11/2014 | Pearson .............. H04N 19/91 375/240.02 |
| 2015/0139298 A1 | 5/2015 | Seregin et al. |
| 2015/0319451 A1 | 11/2015 | Henry |
| 2016/0094851 A1 | 3/2016 | Pu et al. |
| 2016/0100191 A1 | 4/2016 | Mishra et al. |
| 2016/0134876 A1 | 5/2016 | Chong et al. |
| 2017/0094285 A1 | 3/2017 | Said et al. |
| 2017/0238005 A1 | 8/2017 | Chien et al. |
| 2019/0052883 A1 | 2/2019 | Ikeda et al. |
| 2019/0149828 A1* | 5/2019 | Jeong .............. H04N 19/11 375/240.12 |
| 2019/0238837 A1 | 8/2019 | Filippov et al. |
| 2020/0382777 A1 | 12/2020 | Zhang et al. |
| 2020/0382804 A1 | 12/2020 | Zhang et al. |
| 2022/0094956 A1 | 3/2022 | Zhang et al. |
| 2022/0132120 A1* | 4/2022 | Zhang .............. H04N 19/119 |

FOREIGN PATENT DOCUMENTS

| | | |
|---|---|---|
| CN | 113875238 A | 12/2021 |
| EP | 3977730 | 4/2022 |
| KR | 20217042533 | 5/2020 |
| WO | WO-2019010156 A1 * | 1/2019 .......... H04N 19/103 |
| WO | 2020243595 A1 | 12/2020 |

OTHER PUBLICATIONS

Chen et al, "Algorithm and VLSI Architecture of a Parallel Arithmetic Entropy Coder for Parallel H .264 Video Encoders", Proceedings of International Symposium on Signals, Systems and Electronics, (2010).

Santiago De-Luxan-Hernandez et al, "An Intra Subpartition Coding Mode for VVC", Berlin, Germany, (2019).

De-Luxan-Hernandez (Fraunhofer) S et al: "Non-CE3: ISP withindependent sub-partitions for certain block sizes", 126. MPEG Meeting; Mar. 25, 2019-Mar. 29, 2019; Geneva; (Motion Picture Expert Group or ISO/IEC JTC1/SC29/WG11 ), No. m47033 Mar. 12, 2019 (Mar. 12, 2019), XP03021 0411,Retrieved from the Internet: URL:http://phenix.int-evry.fr/mpeg/doc_end_user/documents/ 126_Geneva/wg11 /m47033-JVET -N0372-v1-JVET -N0372.zip JVET -N0372/JVETN0372-v1 .docx [retrieved on Mar. 12, 2019].

Supplemental European Search Report, Application No. 20812562. 5, PCT/US2020035360, dated Feb. 14, 2023, 13 pages.

Unno (KDDI-Research) K et al: "Non-CE3: Relaxation method ofprocessing dependency in ISP for small blocks", 14. JVET Meeting; Mar. 19, 2019-Mar. 27, 2019; Geneva; (The Joint Videoexploration Team of ISO/IEC JTC1/SC29/WG11 and ITU-T SG. 16 ), No. JVET-N0159 Mar. 23, 2019 (Mar. 23, 2019), XP030204604,Retrieved from the Internet:URL:http://phenix.int-evry.fr/jvet/doc_end_user/documents/14_Geneva/wg11 /JVET-N0159-v3.zip JVET-N0159-v2.docx [retrieved on Mar. 23, 2019].

Yang (Interdigital) H et al: "CE3-related: Intra sub-partitionimprovement for low decoding latency and hardware implementationefficiency", 15. JVET Meeting; Jul. 3, 2019-Jul. 12, 2019; Gothenburg; (The Joint Video Exploration Team of ISO/IEC JTC1/SC29/WG11 and ITU-TSG. 16 ),No. JVET-O0311 ; m48421 Jul. 3, 2019 (Jul. 3, 2019), XP030219226, Retrieved from the Internet:URL:http://phenix. int-vry.fr/jvet/doc_end_user/documents/15_Gothenburg/wg11 /JVET-00311-v2.zip JVET-O0311-v2.docx [retrieved on Jul. 3, 2019].

Benjamin Bross, et al. "Non-CE3: ISP with independent sub-partitions for certain block sizes", Joint Video exploration Team(JVET), JVET-N0372-v1, Mar. 23, 2019, pp. 1-8.

Notice of Preliminary Rejection, Korea Patent Application No. 10-2021-7042533, Korean Intellectual Property Office (KIPO), Jan. 22, 2025, 11 pages.

Examination Report, Communication pursuant to Article 94(3) EPC, European Patent Application No. 20812562.5, Jul. 22, 2025, 5 page.

Office Action, Korea Patent Application No. 10-2021-7042533, Korean Intellectual Property Office (KIPO), Sep. 9, 2025, 4 pages.

* cited by examiner

FIG. 2

PROCESSING SUB-PARTITIONS USING REFERENCE PIXELS

CROSS REFERENCE TO RELATED APPLICATIONS

This application is a continuation application and, pursuant to 35 U.S.C. § 120, is entitled to and claims the benefit of earlier filed application U.S. application Ser. No. 17/542,008 filed Dec. 3, 2021, which is a continuation of U.S. application Ser. No. 16/886,627 filed May 28, 2020, which, pursuant to 35 U.S.C. § 119 (e), is entitled to and claims the benefit of the filing date of U.S. Provisional App. No. 62/854,736, filed May 30, 2019, the content of all which is incorporated herein by reference in its entirety for all purposes.

BACKGROUND

In video coding, video content is compressed via a set of processes, including prediction, transformation, quantization, and entropy coding. In intra-prediction, spatial redundancy between adjacent pixels in a video frame is reduced. For example, the original pixels of a video frame may not be encoded and transmitted to a decoder. Rather, predicted pixels may be subtracted from the original pixels to form a residual. The residual is a smaller amount of information than the original pixels to encode and transmit to the decoder. This reduces the bandwidth used to transmit the encoded bitstream.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 depicts an example of a frame for intra prediction according to some embodiments.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

In intra-prediction, a transcoder may subtract predicted pixels from the original pixels of a video frame to reduce the volume of values that needs to be transcoded. One method of an intra-prediction coding mode is to split an intra-coding block into multiple sub-partitions and process the sub-partitions separately. Conventionally, the sub-partitions are processed serially when one sub-partition is transcoded before starting the transcoding process for another sub-partition, or when one sub-partition is decoded before starting the decoding process for another sub-partition. However, some embodiments process groups of the sub-partitions in parallel. This improves the speed of the coding process by at least two times compared to coding the sub-partitions serially.

System

Figure 1:
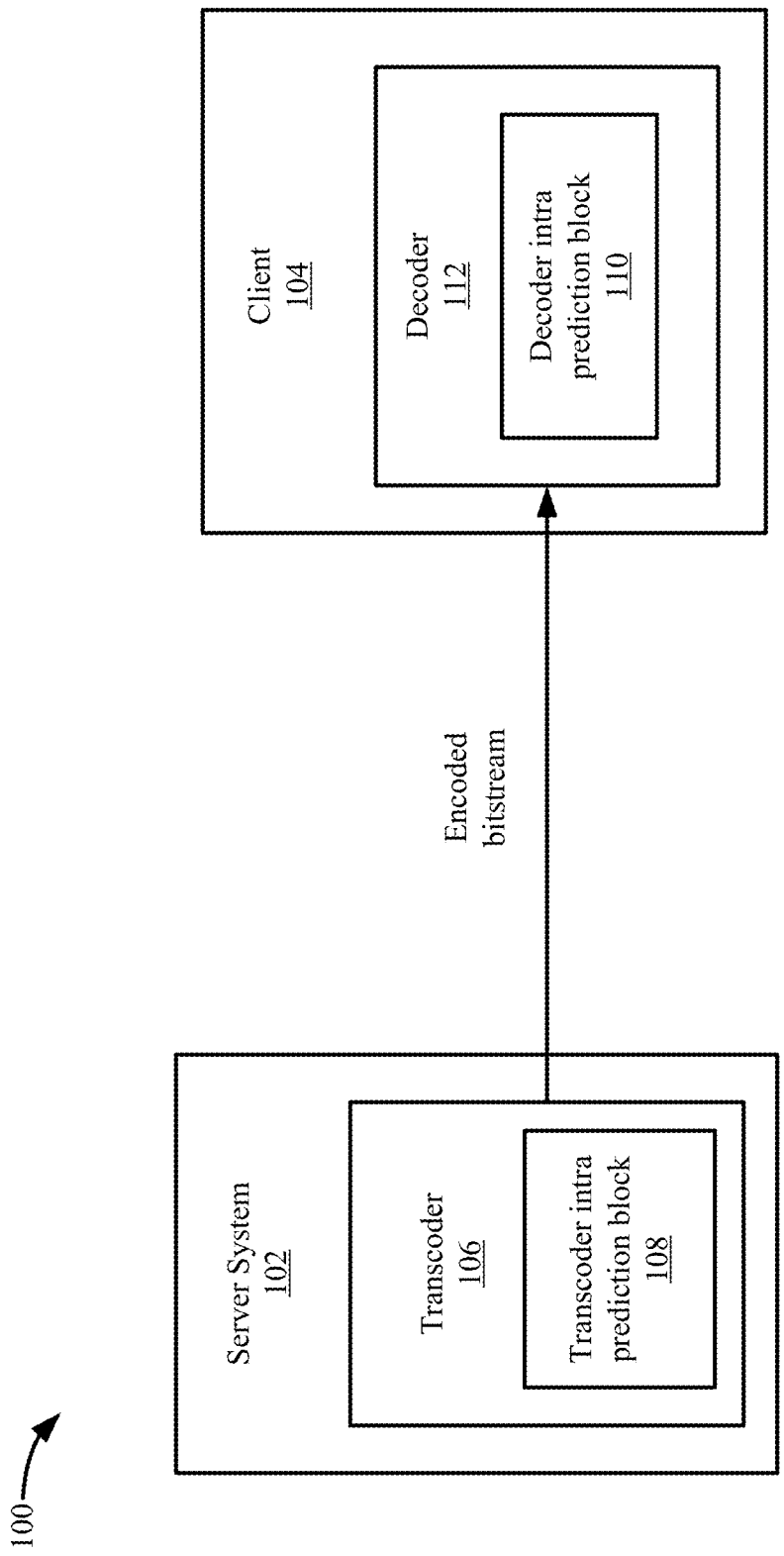
FIG. 1 depicts a simplified system for performing intra prediction according to some embodiments.

FIG. 1 depicts a simplified system 100 for performing intra prediction according to some embodiments. System 100 transcodes a source video asset, which may be any type of video, such as for a television show, movie, or video clip. The source video may need to be transcoded into one or more formats, such as one or more bitrates. In some embodiments, a server system 102 sends an encoded bitstream to client 104. For example, server system 102 may be sending a video to a client 104 for playback.

Server system 102 includes a transcoder 106 that transcodes video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

Transcoder 106 includes a transcoder intra prediction block 108 that performs intra prediction. An intra-coding mode is used by the transcoder side and the decoder side to compress a video by removing spatial redundancy of neighboring pixels in a video frame. Traditionally, intra-coding may intra-code a current block of a pixel size equal to N×N. In some embodiments, the pixels inside the current block are intra-coded using pixels from adjacent blocks to the current block, such as blocks to the top, left, and diagonally to the current block.

Client 104 includes a decoder 112 that decodes the encoded bitstream. During the decoding process, a decoder intra prediction block 110 performs intra prediction to decode a block using the pixels from adjacent blocks to the current block, such as blocks to the top, left, and diagonally to the current block.

Figure 2:
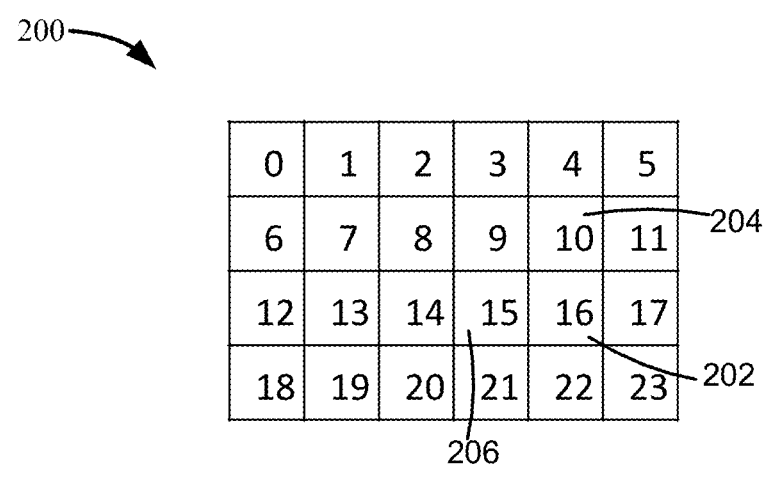

FIG. 2 depicts an example of a frame 200 for intra prediction according to some embodiments. Frame 200 may be an image that is being transcoded or decoded. Frame 200 includes multiple blocks and a current block 202 (#16) is being transcoded or decoded. A top block 204 (#10) to the top of current block 202 and a left block 206 (#15) to the left of current block 202 have already been decoded. The pixels from left block 206 and top block 204 may be used to predict the content of current block 202. Because these pixels have already been decoded, the pixels can be used to predict the content of the current block. For example, the neighboring pixels may be similar to some of the pixels of the current block and provide a good prediction of the current pixels in current block 202. Pixels from other blocks may also be used, such as pixels from blocks #9, #11, and #21 (diagonally located) if pixels from these blocks are available (e.g., have been transcoded and then decoded).

Transcoder

Figure 3:
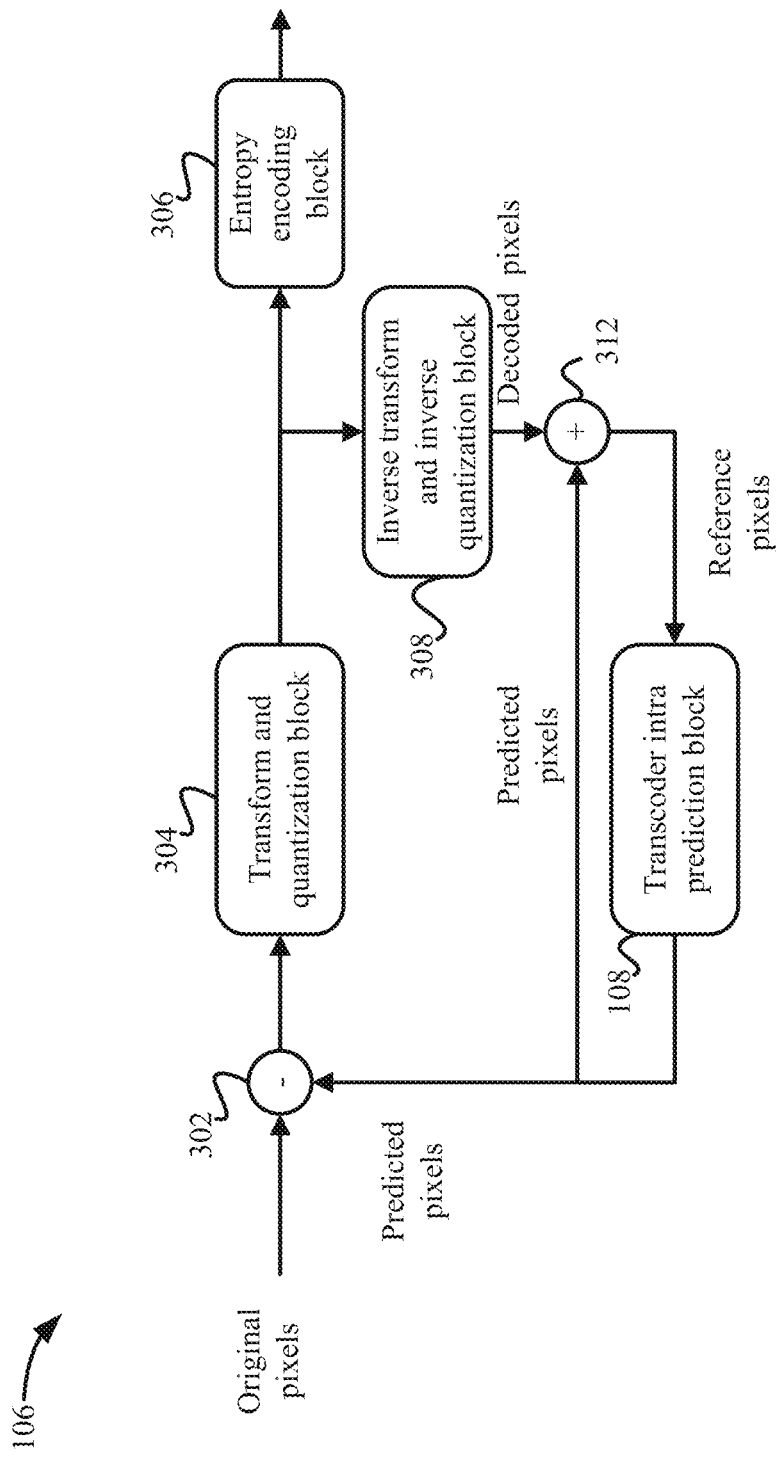
FIG. 3 depicts an example of a transcoder according to some embodiments.

FIG. 3 depicts an example of transcoder 106 according to some embodiments. FIG. 3 includes a simplified version of a transcoder and a more detailed version will be described below. Transcoder 106 receives original pixels from a current block 202 being transcoded. At 302, transcoder 106 then subtracts the predicted pixels from the original pixels to produce a residual, which includes the pixels that will be transcoded. For example, as part of the transcoding process, a transform and quantization block 304 performs a transform step and a quantization step (T/Q) on the residual values to further compress the data size to be transcoded. Finally, an entropy encoding block 306 processes the resulting data by entropy coding the data. Transcoder 106 packages the data into an encoded bitstream that transcoder 106 transmits to the decoder side.

To ensure that the decoder side is performing the decoding process with the identical behavior as the transcoder side, transcoder 106 includes an inverse quantization and inverse transform block 308 and an intra-prediction block (e.g., transcoder intra prediction block 108) that mirrors the decoding pipeline. This loop generates reconstructed pixels for a decoded current block 202, which serve as reference pixels for the next coding block in the encoding order. For example, at 312, transcoder 106 adds the predicted pixels used to transcode the current block with the decoded pixels of the residual to generate the reference pixels.

Transcoder intra prediction block 108 generates the predicted pixel values using neighboring reference pixel values to a next current block to be transcoded. For example, transcoder intra prediction block 108 receives reference pixel values and depending on the intra-mode used, generates predicted pixel values. The intra-prediction mode may include the direction of the prediction, and different reference pixels are used based on the direction used. That is, a horizontal intra-prediction direction may use reference pixels to a left side of the current block and a vertical intra-prediction direction may use reference pixels on the top of the current block. The directions may also include diagonal directions. Transcoder intra prediction block 108 may generate predicted pixels from the reference pixels and the direction of the prediction. Transcoder intra prediction block 108 may determine the direction of the prediction in different ways. In some embodiments, transcoder intra prediction block 108 may examine all the possible intra prediction directions, and select the best one based on rules, such as a rate-distortion optimization metric. The predicted pixels may be used because some directions may require some interpolation of reference pixel values; for instance, a diagonal direction may interpolate pixel values from one or more reference pixels.

Decoder

Figure 4:
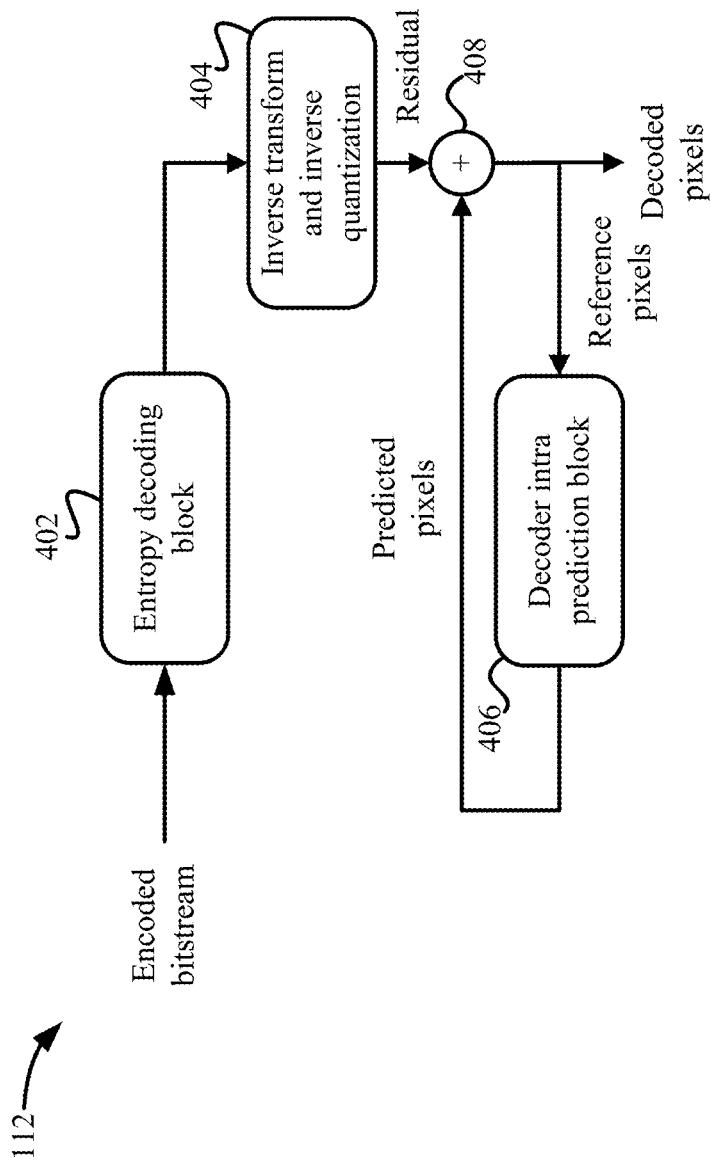
FIG. 4 depicts an example of a decoder according to some embodiments.

FIG. 4 depicts a more detailed example of decoder 112 according to some embodiments. FIG. 4 includes a simplified version of a decoder and a more detailed version will be described below. At the decoder side, decoder 112 receives the encoded bitstream and an entropy decoding block 402 performs entropy decoding. Then, an inverse quantization and inverse transform block 404 performs an inverse quantization step and an inverse transformation step ($Q^{-1}\backslash T^{-1}$). The output of the inverse quantization and inverse transformation steps is the residual. At 408, decoder 112 then combines the residual with the predicted pixels that were used to generate the residual at transcoder 106 to generate the decoded pixels. The decoded pixels are a reconstructed representation of the original pixels.

A decoder intra-prediction block 406 generates the predicted pixels from the reference pixels, such as the decoded reference pixels from the current block being decoded. The decoded pixels are used as reference pixels for the next coding block in the decoding order. Another coding block in the coding order may use predicted pixels that are generated from the reference pixels to decode the encoded bitstream for another block.

Intra Prediction

During intra prediction, the transcoder side and the decoder side may perform intra-sub-partitioning using an intra-sub-partition (ISP) mode. Intra-sub-partitioning splits an intra-coding block into multiple sub-partitions (SP) and transcodes or decodes the sub-partitions separately.

Figure 5:
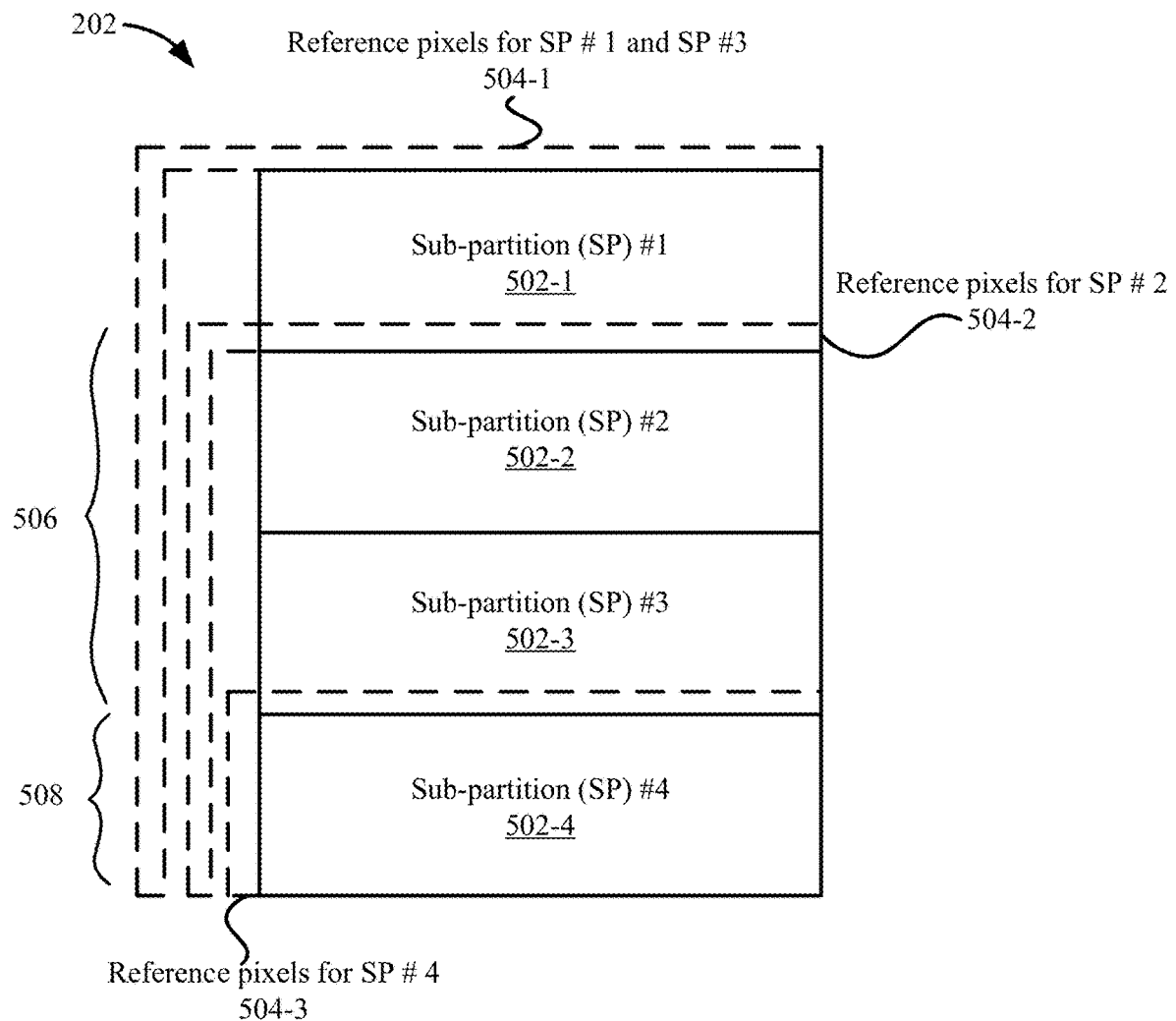
FIG. 5 depicts an example of sub-partitions in a current block according to some embodiments.

FIG. 5 depicts an example of sub-partitions 502 in a current block 202 according to some embodiments. Current block 202 has been split into four sub-partitions of a sub-partition #1 502-1, a sub-partition #2 502-2, a sub-partition #3 502-3, and a sub-partition #4 502-4. Although four sub-partitions are described, other numbers of sub-partitions may be used, such as two sub-partitions, six sub-partitions, eight sub-partitions, etc. Also, the sub-partitions may be split horizontally or vertically. In FIG. 5, the current block has been split horizontally; however, the current block can be split vertically or in other patterns.

In the transcoding process, transcoder 106 processes the sub-partitions 502 separately, which means transcoder 106 transcodes the pixels of a sub-partition 502-1 first, and then transcodes the pixels of a next sub-partition 502-2, and so. As discussed above, transcoder 106 uses reference pixels to transcode each sub-partition 502. For example, reference pixels from already transcoded blocks are used to transcode each sub-partition 502.

Transcoder 106 selects the reference pixels that are used for each sub-partition 502 in a way such that the transcoder can transcode some sub-partitions in parallel. Conventionally, the sub-partitions may have been transcoded serially; for example, the transcoder first transcodes sub-partition #1 502-1, and then uses reference pixels from sub-partition #1 502-1 to transcode sub-partition #2 502-2, and then uses reference pixels from sub-partition #2 502-2 to transcode sub-partition #3 502-3, and then finally uses reference pixels from sub-partition #3 502-3 to transcode sub-partition #4 502-4. This forces the transcoder to transcode the sub-partitions 502 serially. Instead of transcoding sub-partitions 502 serially, the transcoder transcodes groups of the sub-partitions 502 in parallel, which speeds up the transcoding time of the current block. Transcoder 106 may include multiple transcoding processes that can perform the transcoding of sub-partitions 502 in parallel, or separate transcoders may be used.

To transcode the sub-partition 502 in parallel, reference pixels for some of the sub-partitions 502 are changed from the reference pixels used to transcode the sub-partitions serially. For example, the reference pixels that are used for sub-partition #1 502-1 and sub-partition #3 502-3 are shared. Then, the reference pixels that are used for sub-partition #2 502-2 are from sub-partition #1 502-1 and the reference pixels that are used for sub-partition #4 502-4 are from sub-partition #3 502-3. This allows transcoder 106 to transcode sub-partition #1 502-1 and sub-partition #3 502-3 in parallel. Once, transcoder 106 transcodes and decodes sub-partition #1 502-1 and sub-partition #3 502-3, then transcoder 106 can use reference pixels from sub-partition #1 502-1 to transcode sub-partition #2 502-2 and use reference pixels from sub-partition #3 502-3 to transcode sub-partition #4 502-4 in parallel.

Three sets of reference pixels 504-1 to 504-3 are shown for the four sub-partitions 502. If there are a different number of sub-partitions 502, then there may be a different number of sets of reference pixels 504. However, at least two sub-partitions 502 may share reference pixels to allow for parallel processing. It is noted that the reference pixels denoted are drawn for clarity reasons. In some embodiments, the reference pixels may include one or more pixel rows nearest or adjacent to current block 202. That is, reference pixels 504-1 may include reference pixels from a pixel row nearest to current block 202, and not pixel rows farther away compared to reference pixels 504-2 and 504-4. The reference pixels are separated to clearly show the respective reference pixels. However, reference pixels for overlapping portions in the block to the left may include the same pixels. For example, pixels at 506 may be the same and pixels at 508 may be the same. Also, the reference pixels that are used are not limited to the reference pixels shown. Additional reference pixels may be used, such as more reference pixels from the top block or left block, or reference pixels from blocks other than the top and left blocks (e.g., blocks located diagonally from the current block).

Transcoder 106 uses references pixels 504-1 when transcoding sub-partition #1 502-1 and sub-partition #3 502-3. References pixels 504-1 may include reference pixels from a block on top of current block 202 and reference pixels from a block to the left of current block 202. In some embodiments, when transcoding sub-partition #3 502-3, transcoder 106 may favor using an intra direction that uses reference pixels from the block to the left of current block 202 instead of reference pixels to the top of current block 202. The reference pixels to the left of sub-partition #3 502-3 are closer and may provide a more accurate prediction.

Also, reference pixels 504-2 may include reference pixels from sub-partition #2 502-2 and a block to the left of current block 202. The reference pixels used for sub-partition #2 502-2 may be the same as the conventional process.

Reference pixels 504-3 may include reference pixels from sub-partition #3 502-3 and a block to the left of current block 202. The reference pixels used for sub-partition #4 502-2 may be the same as the conventional process.

It is noted that if current block 202 is split vertically, the reference pixels used may be slightly different. For example, current block 202 can be rotated by 90 degrees to illustrate the vertical splitting. However, the concept is the same as the reference pixels for sub-partition #1 502-1 and sub-partition #3 502-3 are shared. Then, the reference pixels for sub-partition #2 502-2 are from sub-partition #1 502-1 and the reference pixels for sub-partition #4 502-4 are from sub-partition #3 502-3.

Decoder 112 may use the sub-partitions in a similar manner in the decoding process, which will be described in more detail below.

Figure 6:
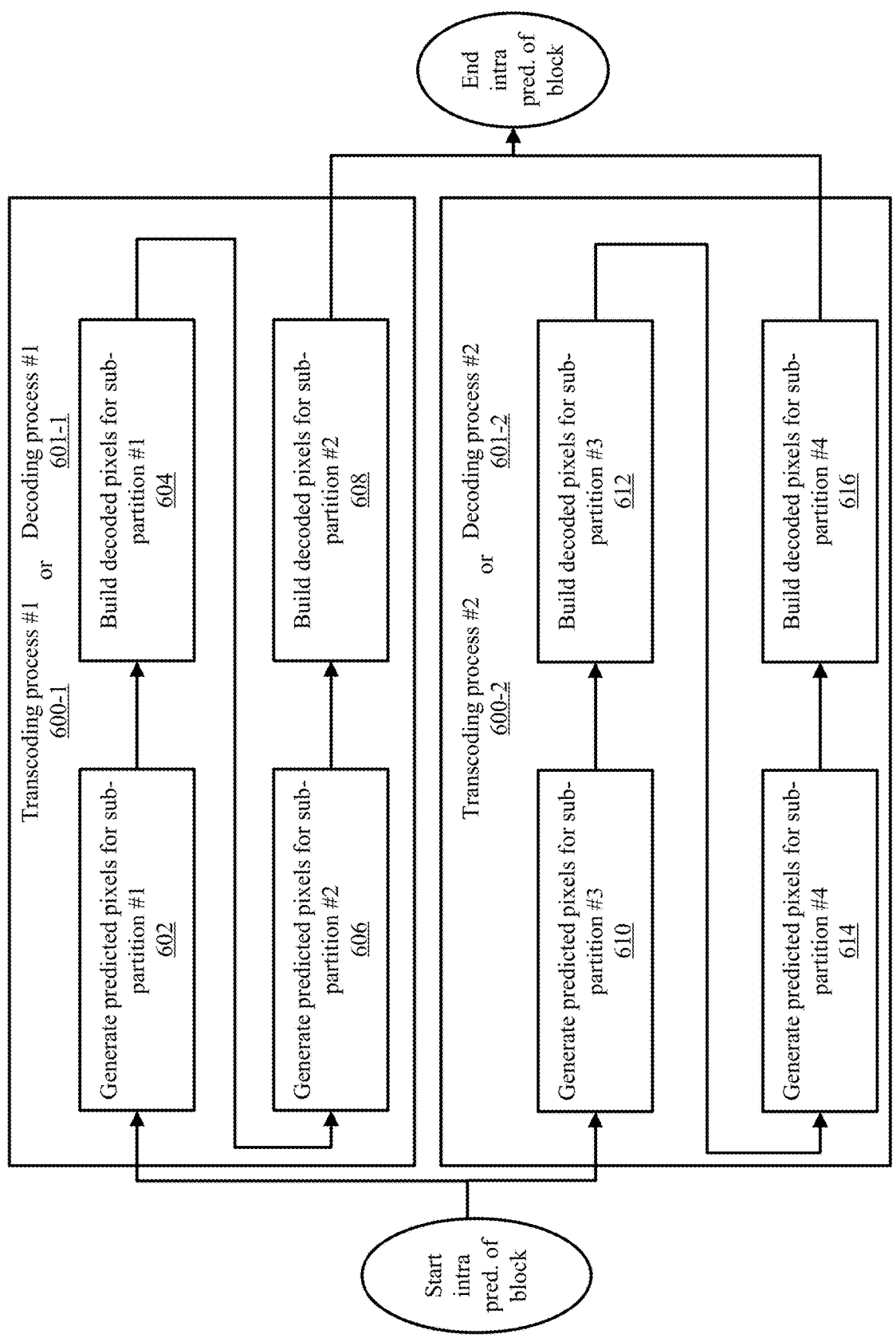
FIG. 6 depicts an example of the intra prediction processing of sub-partitions in parallel according to some embodiments.

FIG. 6 depicts an example of the intra prediction processing of sub-partitions 502 in parallel according to some embodiments. The following processing pipeline may be used in the transcoding process or the decoding process. In the transcoding process, the pipeline generates predicted pixels for a sub-partition and then after the transcoding of the sub-partition, the decoded pixels for the sub-partition are generated for use as reference pixels for another sub-partition. If the process is performed serially, the above process of generating predicted pixels for a sub-partition and then building decoded pixels for the sub-partition is performed for each sub-partition serially. For example, first, transcoder 106 generates predicted pixels for sub-partition #1 502-1, generates a residual and transcodes the residual, and then transcoder 106 builds decoded pixels for sub-partition #1 502-1. Transcoder 106 uses these decoded pixels as reference pixels to generate the predicted pixels for sub-partition #2 502-2. After intra-coding sub-partition #2 502-2, transcoder 106 builds decoded pixels for sub-partition #2 502-2. Transcoder 106 uses these decoded pixels to generate predicted pixels for sub-partition #3 502-3, and the process continues serially until transcoder 106 transcodes the current block. Accordingly, when processing sub-partitions 502 serially, transcoder 106 must conventionally finish transcoding the sub-partition and decoding the pixels for the sub-partition before moving on to transcoding another sub-partition.

As discussed above, transcoder 106 does not need to wait for a prior sub-partition to be transcoded and then decoded before starting the transcoding process for another sub-partition. In FIG. 6, when transcoding of the current block is started, reference pixels for sub-partition #1 502-1 and sub-partition #3 502-3 are the same, and transcoder 106 starts transcoding sub-partition #1 502-1 at 602 and sub-partition #3 502-3 at 610 in parallel. For example, a transcoding process #1 600-1 transcodes sub-partition #1 502-1 and a transcoding process #2 600-2 transcodes sub-partition #3 502-3.

At 602, transcoding process #1 600-1 generates predicted pixels for sub-partition #1 502-1 using reference pixels from adjacent blocks, such as the block to the top of current block 202 and the block to the left of current block 202. Then, transcoding process #1 600-1 performs the transcoding process for sub-partition #1 502-1. After transcoding the pixels, at 604, transcoding process #1 600-1 then reconstructs (e.g., decodes) pixels for sub-partition #1 502-1. In parallel, at 610, transcoding process #2 600-2 generates predicted pixels for sub-partition #3 502-3 using the same reference pixels that were used for sub-partition #1 502-1. Then, transcoding process #2 600-2 performs the transcoding process for sub-partition #3 502-3. After transcoding the pixels, at 612, transcoding process #2 600-2 then reconstructs (e.g., decodes) pixels for sub-partition #3 502-3.

Sub-partition #2 502-2 uses reference pixels from sub-partition #1 502-1 and from adjacent blocks, such as the block to the left. After reconstructing the decoded pixels for sub-partition #1 502-1, at 606, transcoding process #1 600-1 can generate predicted pixels from the reference pixels for sub-partition #2 502-2 and the block to the left. Transcoding process #1 600-1 performs the transcoding process for sub-partition #2 502-2. After transcoding the pixels, at 608, transcoding process #1 600-1 then reconstructs (e.g., decodes) pixels for sub-partition #2 502-2.

Also, sub-partition #4 502-4 uses reference pixels from sub-partition #3 502-3. After reconstructing the transcoded pixels for sub-partition #3 502-3, at 614, transcoding process #2 600-2 can generate predicted pixels from the reference pixels from sub-partition #4 502-4 and from adjacent blocks, such as the block to the left. Transcoding process #2 600-2 performs the transcoding process for sub-partition #4 502-4. After transcoding the pixels, at 616, transcoding process #2 600-2 then reconstructs (e.g., decodes) pixels for sub-partition #4 502-4.

The transcoding process finishes after reconstructing transcoded pixels for sub-partition #2 502-2 and reconstructing transcoded pixels for sub-partition #4 502-4. Accordingly, due to the parallel processing of two groups of sub-partitions 502, transcoder 106 can perform the transcoding process two times faster compared to performing the processing in serial. Although two groups are described, the transcoder may split current block 202 into different numbers of groups. For example, if eight sub-partitions 502 are used, two groups may be used; however, the transcoder may split the sub-partition 502 into four groups to perform the process four times faster than compared to serially and two times faster compared to using two groups.

In the decoding process, the sub-partition 502 may also be decoded in parallel. For example, when decoder 112 starts decoding current block 202, reference pixels for sub-partition #1 502-1 and sub-partition #3 502-3 are the same, and decoder 112 starts decoding sub-partition #1 502-1 and sub-partition #3 502-3 in parallel. Decoder 112 may also use two decoding processes decoding process #1 601-1 and decoding process #2 600-2 similarly to transcoder 106. Decoding process #1 601-1 generates predicted pixels for sub-partition #1 502-1 using pixels from adjacent blocks, such as from the block to the top of current block 202 and the block to the left of current block 202. Then, decoding process #1 601-1 performs the decoding process for sub-partition #1 502-1 to generate the residual. After decoding the pixels, decoding process #1 601-1 then reconstructs pixels for sub-partition #1 502-1 using the predicted pixels and the residual. In parallel, decoding process #2 600-2 generates predicted pixels for sub-partition #3 502-3 using the same reference pixels that were used for sub-partition #1 502-1. Then, decoding process #2 600-2 performs the decoding process for sub-partition #3 502-3. After decoding the pixels, decoding process #2 600-2 then reconstructs reference pixels for sub-partition #3 502-3 using the predicted pixels and the residual.

Sub-partition #2 502-2 uses reference pixels from sub-partition #1 502-1 and from adjacent blocks, such as the left block. After decoding the pixels for sub-partition #1 502-1, decoding process #1 601-1 can generate predicted pixels from the reference pixels of the decoded sub-partition #1 502-1 and from adjacent blocks, such as the left block. Decoding process #1 601-1 performs the decoding process for sub-partition #2 502-2 to generate the residual. After decoding the pixels, decoding process #1 601-1 then reconstructs reference pixels for sub-partition #2 502-2 using the predicted pixels and the residual.

Sub-partition #3 502-3 uses the same reference pixels as sub-partition #1 502-1 and the decoding process may be performed in parallel with sub-partition #1 502-1. Decoding process #2 600-2 performs the decoding process for sub-partition #3 502-3 to generate the residual. After decoding the pixels, decoding process #2 600-2 then reconstructs reference pixels for sub-partition #3 502-3 using the predicted pixels and the residual.

Sub-partition #4 502-4 uses reference pixels from sub-partition #3 502-3 and from adjacent blocks, such as the left block. After reconstructing the reference pixels for sub-partition #3 502-3, decoding process #2 600-2 can generate predicted pixels from the reference pixels for sub-partition #3 502-3 and the left block. Then, decoding process #2 600-2 performs the decoding process for sub-partition #4 502-4 to generate the residual. After decoding the pixels, decoding process #2 600-2 then reconstructs reference pixels for sub-partition #4 502-4 using the predicted pixels and the residual.

Figure 7:
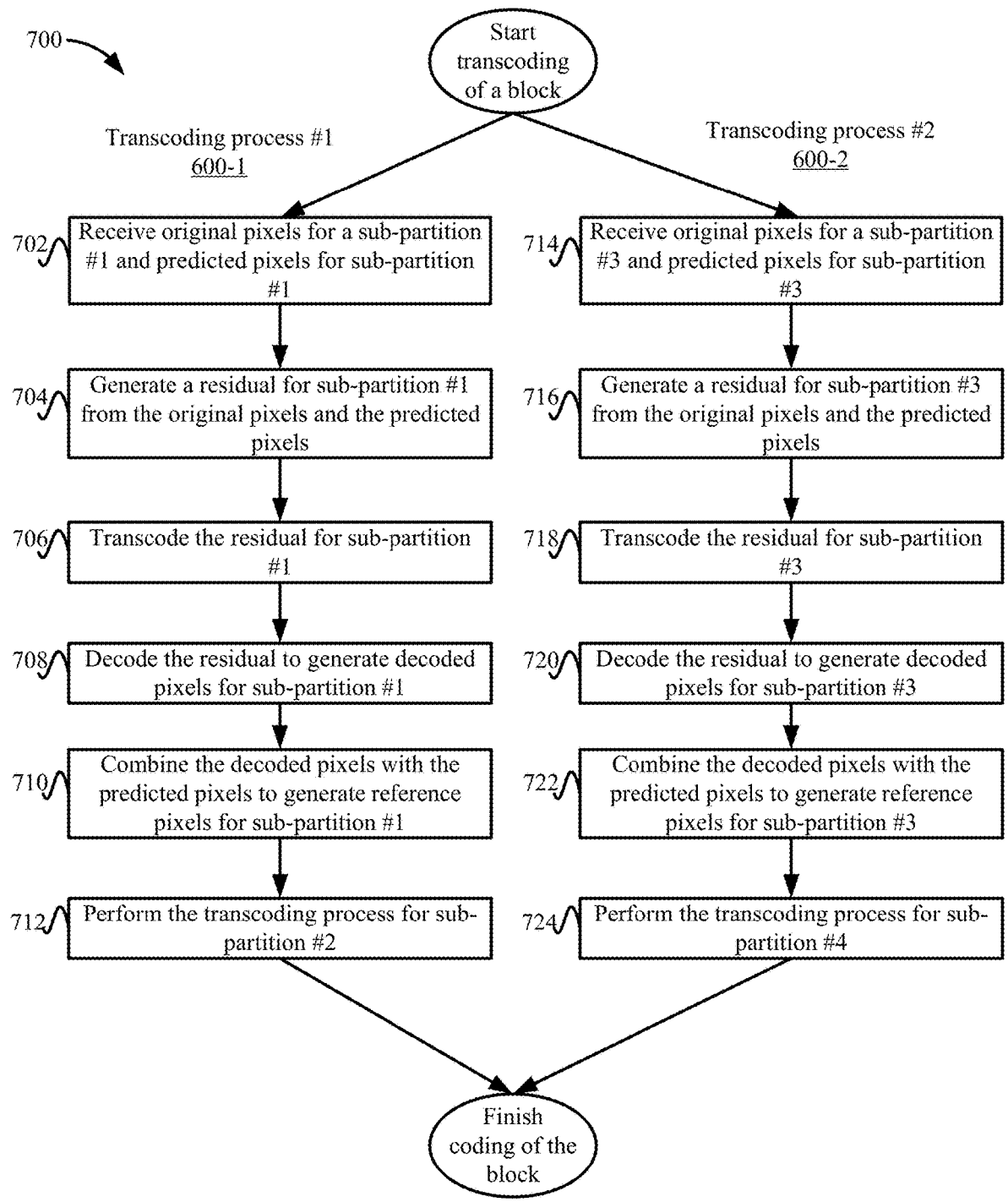
FIG. 7 depicts a more detailed flowchart of the transcoding of a block according to some embodiments.

FIG. 7 depicts a more detailed flowchart 700 of the transcoding of a block according to some embodiments. The above flow discussed the generation of predicted pixels. The following flowchart describes the transcoding process in more detail.

At 702, transcoding process #1 600-1 receives original pixels for a sub-partition #1 502-1 and predicted pixels for sub-partition #1 502-1. At 704, transcoding process #1 600-1 generates a residual for sub-partition #1 from the original pixels and the predicted pixels. At 706, transcoding process #1 600-1 transcodes the residual for sub-partition #1 502-1 by performing transformation and quantization and entropy encoding. At 708, transcoding process #1 600-1 decodes the residual to generate decoded pixels for sub-partition #1 502-1. At 710, transcoding process #1 600-1 combines the decoded pixels with the predicted pixels to generate reference pixels for sub-partition #1 502-1. At 712, the transcoding process for sub-partition #2 502-2 is performed using similar steps as described in 702 to 710. However, sub-partition #2 uses reference pixels from sub-partition #1.

In parallel, the following is performed. It is noted that the corresponding steps may not be performed exactly at the same time. That is, the steps at 702 and 712 do not need to start and end at the same time. Rather, steps at 702 to 712 are performed in parallel with steps at 714 to 724 where each step may proceed at its own pace. At 714, transcoding process #2 600-2 receives original pixels for a sub-partition #3 502-3 and predicted pixels for sub-partition #3 502-3. At 716, transcoding process #2 600-2 generates a residual for sub-partition #1 from the original pixels and the predicted pixels. At 718, transcoding process #2 600-2 transcodes the residual for sub-partition #3 502-3 by performing transformation and quantization and entropy encoding. At 720, transcoding process #2 600-2 decodes the residual to generate decoded pixels for sub-partition #3 502-3. At 722, transcoding process #2 600-2 combines the decoded pixels with the predicted pixels to generate reference pixels for sub-partition #3 502-3. At 724, the transcoding process for sub-partition #4 502-4 is performed using similar steps as described in 714 to 724. However, sub-partition #4 uses reference pixels from sub-partition #2.

Figure 8:
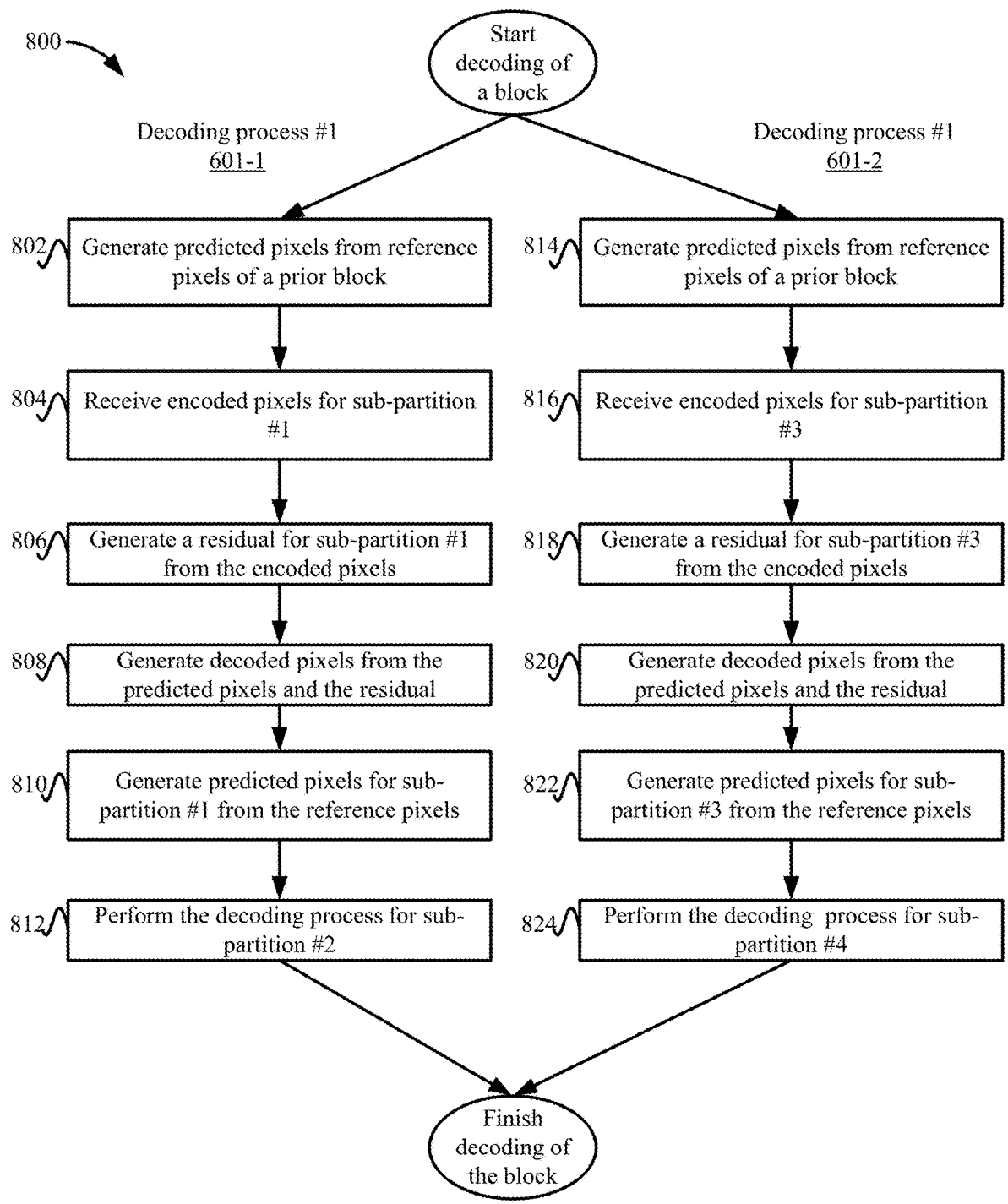
FIG. 8 depicts a more detailed flowchart of the decoding of a block according to some embodiments.

FIG. 8 depicts a more detailed flowchart 800 of the decoding of a block according to some embodiments. At 802, decoding process #1 601-1 generates predicted pixels from reference pixels of a prior block. The prior block may be the block to the top of current block 202 and/or to the left of current block 202. Also, the prior block may a sub-partition of current block 202 or another block.

At 804, decoding process #1 601-1 receives encoded pixels for sub-partition #1. At 806, decoding process #1 601-1 generates a residual for sub-partition #1 from the encoded pixels. For example, decoding process #1 601-1 may perform entropy decoding and an inverse quantization and transformation. At 808, decoding process #1 601-1 generates decoded pixels from the predicted pixels and the residual. For example, decoding process #1 601-1 may combine the decoded pixels with the predicted pixels.

At 810, decoding process #1 601-1 generates predicted pixels for sub-partition #1 from the reference pixels. At 812, decoding process #1 601-1 performs the prediction process for sub-partition #2. The process may be similar to steps 802-810. However, sub-partition #2 uses reference pixels from sub-partition #1.

In parallel, the following is performed. It is noted that the corresponding steps may not be performed exactly at the same time. That is, the steps at 802 and 812 do not need to start and end at the same time. Rather, steps at 802 to 812 are performed in parallel with steps at 814 to 824 where each step may proceed at its own pace. At 814, decoding process #2 601-2 generates predicted pixels from reference pixels of a prior block. At 816, decoding process #2 601-2 receives encoded pixels for sub-partition #3. At 818, decoding process #2 601-2 generates a residual for sub-partition #3 from the encoded pixels. At 820, decoding process #2 601-2 generates decoded pixels from the predicted pixels and the residual. At 822, decoding process #2 601-2 generates predicted pixels for sub-partition #3 from the reference pixels. At 824, decoding process #2 601-2 performs the prediction process for sub-partition #4. The process may be similar to steps 814-822. However, sub-partition #4 uses reference pixels from sub-partition #2.

CONCLUSION

Figure 9:
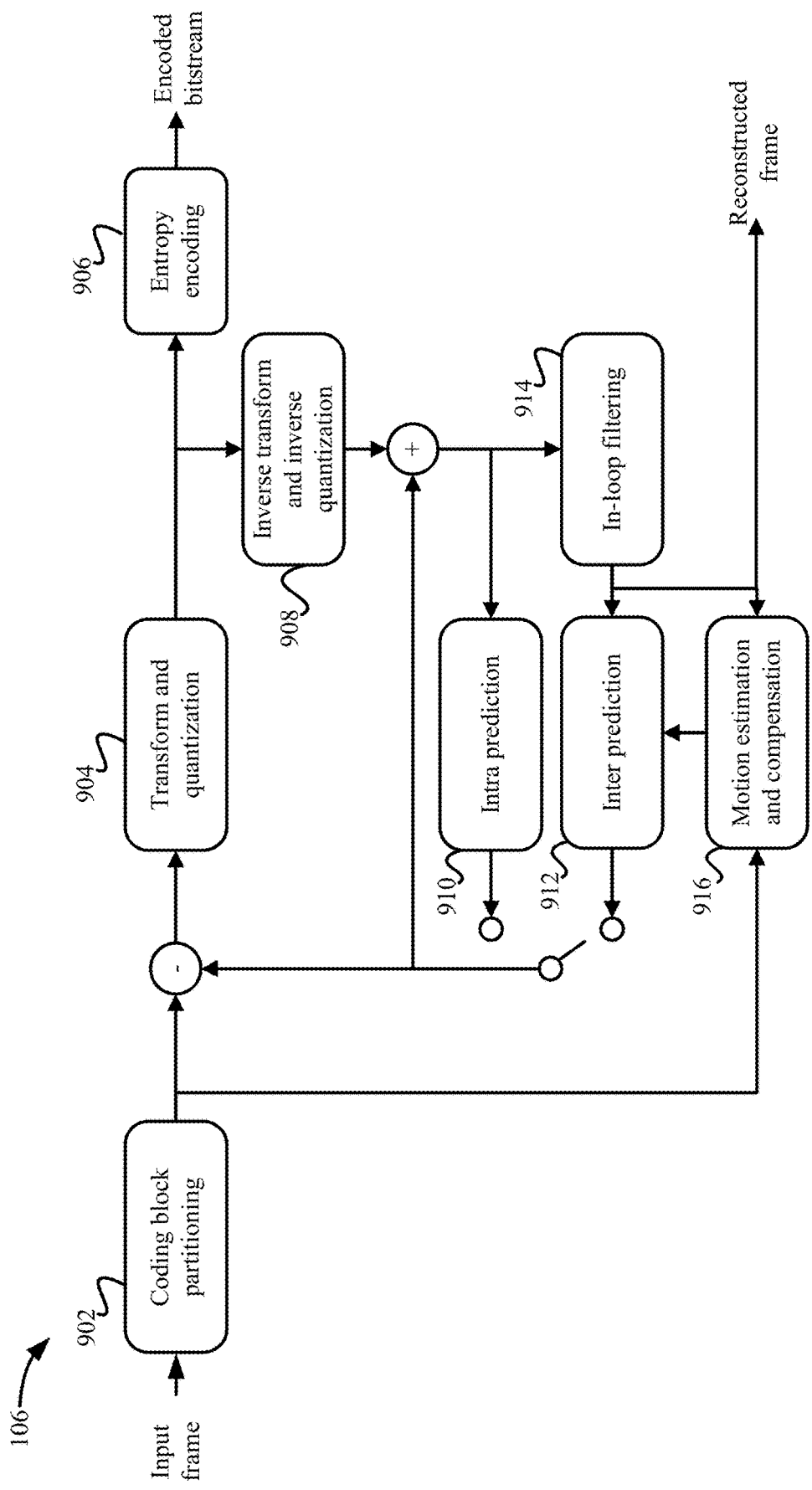
FIG. 9 depicts an example of an encoding system according to some embodiments.

Accordingly, by using the same reference pixels for multiple sub-partitions of a block, the transcoding and decoding process can be performed more efficiently. This improves the performance of a transcoder and/or decoder. System FIG. 9 depicts an example of a transcoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 910, which is using reference pixels in the current frame, aims to reduce the spatial redundancy within the frame. An inter prediction block 912, which is using reference pixels from neighboring frames, attempts to remove the temporal redundancy between frames. A motion estimation and compensation block 916 may be a sub-module of inter prediction at the transcoder side, which captures the motion trace of objects among adjacent frames and generates reference pixels for inter prediction.

A transform and quantization block 904 uses the residual pixels after intra or inter prediction. Transform and quantization block 904 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 106 and decoder 112, transcoder 106 contains decoding modules to make sure both transcoder 106 and decoder 112 are using identical mathematical processes. Thus, an inverse transform and inverse quantization block 908 is similar to the same block on the decoder side. Inverse transform and inverse quantization block 908 reconstructs pixels using the intra and inter prediction.

An in-loop filter 914 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 906 may further compress the bitstream using a model-based method. Transcoder 106 transmits the resulting encoded bitstream to decoder 112 over a network or other types of medium.

Figure 10:
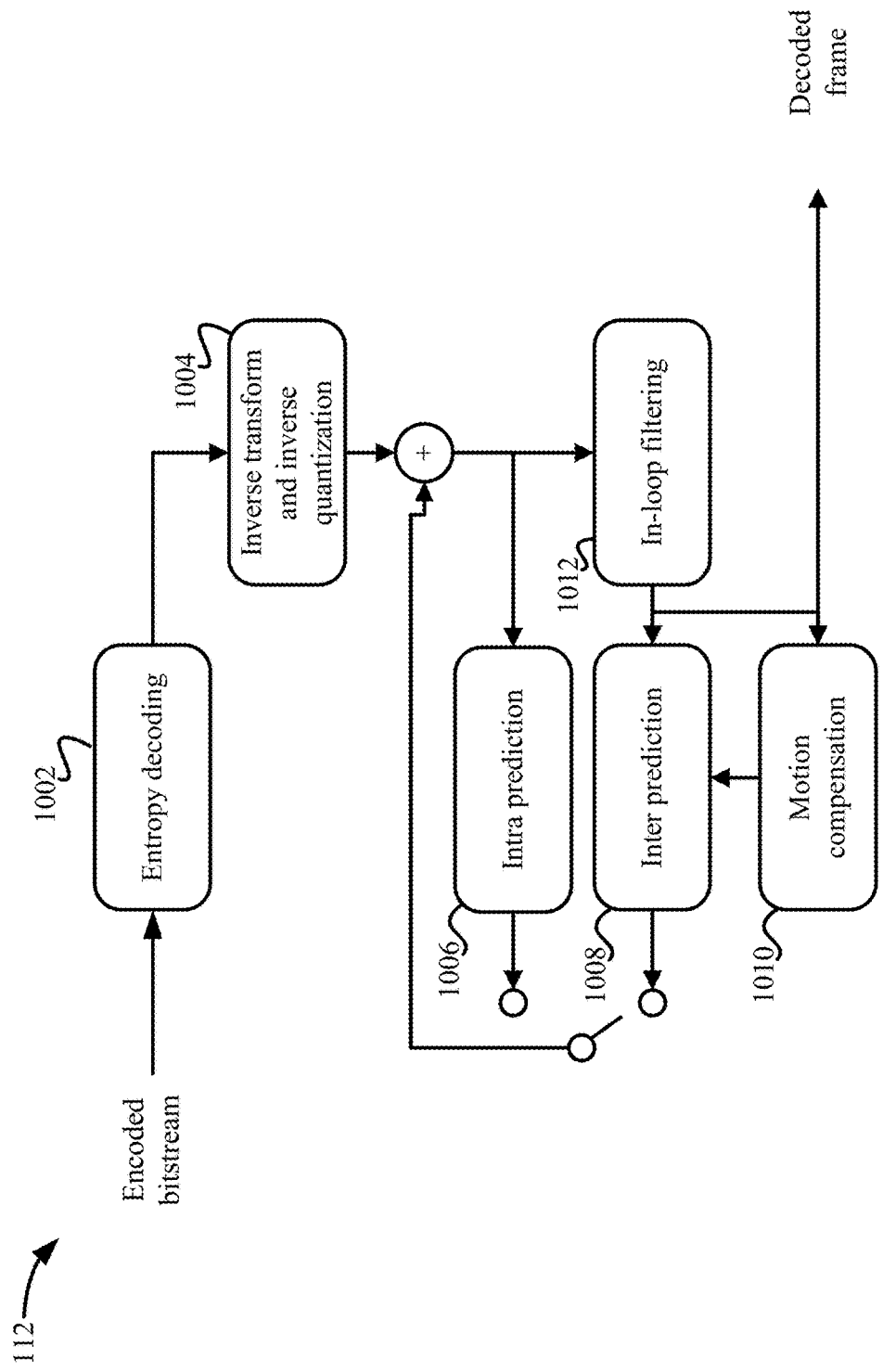
FIG. 10 depicts an example of a decoding system according to some embodiments.

FIG. 10 depicts an example of a decoding system according to some embodiments. Decoder 112 receives the encoded bitstream and inputs it into an entropy decoding block 1002 to recover the information needed for decoding process. As above-mentioned, a decoded frame can be decoded by using an inverse transform and inverse quantization block 1004, an intra prediction block 1006 or inter prediction block 1008, motion compensation block 1010, and in-loop filtering block 1012 in the same way to build a decoded frame.

Example Embodiments

In some embodiments, a method comprising: receiving, by a computing device, a current block to be coded; splitting, by the computing device, the current block into a plurality of sub-partitions; determining, by the computing device, a first set of reference pixels; processing, by the computing device, a first sub-partition in the plurality of sub-partitions using the first set of reference pixels and a second sub-partition in the plurality of sub-partitions using the first set of reference pixels in parallel; and processing, by the computing device, a third sub-partition in the plurality of sub-partitions based on a second set of reference pixels determined from the processing of the first sub-partition and processing a fourth sub-partition in the plurality of sub-partitions based on a third set of reference pixels determined from the processing of the second sub-partition.

In some embodiments, the first set of reference pixels comprise pixels from an adjacent block to the current block in a frame.

In some embodiments, the first set of reference pixels comprises pixels from a left block that is located to the left of the current block and a top block that is located to the top of the current block in a frame.

In some embodiments, the first sub-partition is located at a first position along an edge of a frame, and the second sub-partition is not located next to the first sub-partition.

In some embodiments, the third sub-partition is located in between the first sub-partition and the second sub-partition.

In some embodiments, the fourth sub-partition is located next to the second sub-partition.

In some embodiments, the first set of reference pixels are generated from decoded pixels of another block other than the current block.

In some embodiments, the second set of reference pixels are generated from decoded pixels of the first sub-partition, and the third set of reference pixels are generated from decoded pixels of the second sub-partition.

In some embodiments, the second set of reference pixels are generated from a first residual of the first sub-partition, and the third set of reference pixels are generated from a second residual of the second sub-partition.

In some embodiments, processing the first sub-partition using the first set of reference pixels and the second sub-partition using the first set of reference pixels in parallel comprises: generating first predicted pixels from the first set of reference pixels; using the first predicted pixels to transcode the first sub-partition; generating second predicted pixels from the second set of reference pixels; and using the second predicted pixels to transcode the second sub-partition.

In some embodiments, processing the third sub-partition in the plurality of sub-partitions based on the second set of reference pixels determined from the processing of the first sub-partition and processing the fourth sub-partition in the plurality of sub-partitions based on the third set of reference pixels determined from the processing of the second sub-partition comprises: generating third predicted pixels from the second set of reference pixels; using the third predicted pixels to transcode the third sub-partition; generating fourth predicted pixels from the third set of reference pixels; and using the fourth predicted pixels to transcode the fourth sub-partition.

In some embodiments, the second set of reference pixels are generated from first decoded pixels of the first sub-partition and the first predicted pixels, and the third set of reference pixels are generated from second decoded pixels of the second sub-partition and the second predicted pixels.

In some embodiments, processing the first sub-partition using the first set of reference pixels and the second sub-partition using the first set of reference pixels in parallel comprises: decoding the first sub-partition; generating first predicted pixels from the first set of reference pixels; generating the second set of reference pixels from the decoded first sub-partition and the first predicted pixels; decoding the second sub-partition; generating second predicted pixels from the second set of reference pixels; and generating the third set of reference pixels from the decoded second sub-partition and the second predicted pixels.

In some embodiments, a non-transitory computer-readable storage medium containing instructions, that when executed, control a computer system to be operable for: receiving a current block to be coded; splitting the current block into a plurality of sub-partitions; determining a first set of reference pixels; processing a first sub-partition in the plurality of sub-partitions using the first set of reference pixels and a second sub-partition in the plurality of sub-partitions using the first set of reference pixels in parallel; and processing a third sub-partition in the plurality of sub-partitions based on a second set of reference pixels determined from the processing of the first sub-partition and processing a fourth sub-partition in the plurality of sub-partitions based on a third set of reference pixels determined from the processing of the second sub-partition.

In some embodiments, the first set of reference pixels comprise pixels from an adjacent block to the current block in a frame.

In some embodiments, processing the first sub-partition using the first set of reference pixels and the second sub-partition using the first set of reference pixels in parallel comprises: generating first predicted pixels from the first set of reference pixels; using the first predicted pixels to transcode the first sub-partition; generating second predicted pixels from the second set of reference pixels; and using the second predicted pixels to transcode the second sub-partition.

In some embodiments, processing the third sub-partition in the plurality of sub-partitions based on the second set of reference pixels determined from the processing of the first sub-partition and processing the fourth sub-partition in the plurality of sub-partitions based on the third set of reference pixels determined from the processing of the second sub-partition comprises: generating third predicted pixels from the second set of reference pixels; using the third predicted pixels to transcode the third sub-partition; generating fourth predicted pixels from the third set of reference pixels; and using the fourth predicted pixels to transcode the fourth sub-partition.

In some embodiments, the second set of reference pixels are generated from first decoded pixels of the first sub-partition and the first predicted pixels, and the third set of reference pixels are generated from second decoded pixels of the second sub-partition and the second predicted pixels.

In some embodiments, processing the first sub-partition using the first set of reference pixels and the second sub-partition using the first set of reference pixels in parallel comprises: decoding the first sub-partition; generating first predicted pixels from the first set of reference pixels; generating the second set of reference pixels from the decoded first sub-partition and the first predicted pixels; decoding the second sub-partition; generating second predicted pixels from the second set of reference pixels; and generating the third set of reference pixels from the decoded second sub-partition and the second predicted pixels.

In some embodiments, an apparatus comprising: one or more computer processors; and a non-transitory computer-readable storage medium comprising instructions, that when executed, control the one or more computer processors to be operable for: receiving a current block to be coded; splitting the current block into a plurality of sub-partitions; determining a first set of reference pixels; processing a first sub-partition in the plurality of sub-partitions using the first set of reference pixels and a second sub-partition in the plurality of sub-partitions using the first set of reference pixels in parallel; and processing a third sub-partition in the plurality of sub-partitions based on a second set of reference pixels determined from the processing of the first sub-partition and processing a fourth sub-partition in the plurality of sub-partitions based on a third set of reference pixels determined from the processing of the second sub-partition.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    transcoding, by a first transcoding process, a first sub-partition of a current block using a first set of reference pixels;
    transcoding, by a second transcoding process, a second sub-partition of the current block using the first set of reference pixels;
    transcoding, by the first transcoding process, a third sub-partition of the current block based on a second set of reference pixels; and
    transcoding, by the second transcoding process, a fourth sub-partition of the current block based on a third set of reference pixels.

2. The method of claim 1, wherein:
    the second set of reference pixels are determined based on transcoding the first sub-partition; and
    the third set of reference pixels are determined based on transcoding the second sub-partition.

3. The method of claim 1, wherein:
    transcoding the first sub-partition and transcoding the second sub-partition is performed in parallel.

4. The method of claim 3, wherein:
    the third sub-partition and the fourth sub-partition are transcoded in parallel after transcoding the first sub-partition and the second sub-partition.

5. The method of claim 1, wherein:
    transcoding the first sub-partition comprises:
    decoding the first sub-partition to generate first decoded pixels for the first sub-partition;
    generating the second set of reference pixels from the first decoded pixels for the first sub-partition;
    transcoding the second sub-partition comprises:
    decoding the second sub-partition to generate second decoded pixels for the second sub-partition; and
    generating the third set of reference pixels from the second decoded pixels for the second sub-partition.

6. The method of claim 1, wherein:
    transcoding the first sub-partition comprises:
    generating first predicted pixels from the first set of reference pixels; and
    using the first predicted pixels to transcode the first sub-partition;
    transcoding the second sub-partition comprises:
    generating second predicted pixels from the first set of reference pixels; and
    using the second predicted pixels to transcode the second sub-partition.

7. The method of claim 1, wherein transcoding the first sub-partition comprises:
    determining first original pixels and first predicted pixels for the first sub-partition;
    generating a residual for the first sub-partition from the first original pixels and the first predicted pixels;
    transcoding the first residual for the first sub-partition;
    decoding the first residual for the first sub-partition to generate first decoded pixels; and
    combining the first decoded pixels with the first predicted pixels for use in the second set of reference pixels.

8. The method of claim 7, wherein transcoding the second sub-partition comprises:
    determining second original pixels and second predicted pixels for the second sub-partition;
    generating a residual for the second sub-partition from the second original pixels and the second predicted pixels;
    transcoding the second residual for the second sub-partition;
    decoding the second residual for the second sub-partition to generate second decoded pixels; and
    combining the second decoded pixels with the second predicted pixels for use in the third set of reference pixels.

9. The method of claim 1, wherein:
    transcoding the first sub-partition comprises:
    decoding the first sub-partition;
    generating first predicted pixels from the first set of reference pixels; and
    generating the second set of reference pixels from the decoded first sub-partition and the first predicted pixels;
    and transcoding the second sub-partition comprises:
    decoding the second sub-partition;
    generating second predicted pixels from the second set of reference pixels; and
    generating the third set of reference pixels from the decoded second sub-partition and the second predicted pixels.

10. The method of claim 1, wherein transcoding the first sub-partition comprises:
    determining first predicted pixels from other reference pixels for another block;
    generating a first residual for the first sub-partition from first encoded pixels of the first sub-partition;
    generating first decoded pixels from the first predicted pixels and the first residual;
    generating first predicted pixels for the first sub-partition from the other reference pixels; and
    using the first predicted pixels to decode the third sub-partition.

11. The method of claim 10, wherein transcoding the second sub-partition comprises:
    determining second predicted pixels from the other reference pixels for another block;
    generating a second residual for the second sub-partition from second encoded pixels of the second sub-partition;
    generating second decoded pixels from the second predicted pixels and the second residual;
    generating second predicted pixels for the second sub-partition from the other reference pixels; and
    using the second predicted pixels to decode the fourth sub-partition.

12. The method of claim 1, wherein:
    the third sub-partition and the fourth sub-partition are located in between the first sub-partition and the second sub-partition.

13. The method of claim 1, wherein:
    the second set of reference pixels are adjacent to the third sub-partition, and
    the third set of reference pixels are adjacent to the fourth sub-partition.

14. The method of claim 1, wherein:
the second set of reference pixels and the third set of reference pixels include a first portion of pixels that are different and a second portion of pixels that are the same.

15. The method of claim 1, wherein:
the first set of reference pixels, the second set of reference pixels, and the third set of reference pixels include a first portion of pixels that are different and a second portion of pixels that are the same.

16. The method of claim 1, wherein:
the first transcoding process and the second transcoding process are different processes.

17. A non-transitory computer-readable storage medium containing instructions, that when executed, control a computer system to be operable for:
transcoding, by a first transcoding process, a first sub-partition of a current block using a first set of reference pixels;
transcoding, by a second transcoding process, a second sub-partition of the current block using the first set of reference pixels;
transcoding, by the first transcoding process, a third sub-partition of the current block based on a second set of reference pixels; and
transcoding, by the second transcoding process, a fourth sub-partition of the current block based on a third set of reference pixels.

18. A system comprising:
a first transcoding process operable for:
transcoding a first sub-partition of a current block using a first set of reference pixels; and
transcoding a third sub-partition of the current block based on a second set of reference pixels;
a second transcoding process operable for:
transcoding a second sub-partition of the current block using the first set of reference pixels; and
transcoding a fourth sub-partition of the current block based on a third set of reference pixels.

19. The system of claim 18, wherein:
the first transcoding process and the second transcoding process are different processes.

20. The system of claim 18, wherein:
the first transcoding process and the second transcoding process trancodes the first sub-partition and the second sub-partition in parallel.

* * * * *